United States Patent [19]

Maio et al.

[11] 4,132,085
[45] Jan. 2, 1979

[54] CONTROL APPARATUS INCLUDING AN ELECTRONIC TIMER

[75] Inventors: Kenji Maio; Fumiyuki Inose, both of Kokubunji; Norio Yokozawa, Fuchu; Ryoichi Fujimoto, Ohira; Kazuo Takasugi, Higashi-Yamato, all of Japan

[73] Assignee: Hitachi, Ltd., Japan

[21] Appl. No.: 670,724

[22] Filed: Mar. 26, 1976

Related U.S. Application Data

[63] Continuation of Ser. No. 480,476, Jun. 18, 1974, abandoned.

[30] Foreign Application Priority Data

Jun. 20, 1973 [JP] Japan .................................. 48/68778
Aug. 31, 1973 [JP] Japan .................................. 48/97304

[51] Int. Cl.$^2$ ...................... F25D 21/06; G01R 29/02
[52] U.S. Cl. ...................................... 62/155; 328/129
[58] Field of Search ....................... 328/48, 129, 130; 307/293, 141, 141.4, 141.8, 117; 62/155, 158; 361/22

[56] References Cited

U.S. PATENT DOCUMENTS

| 3,383,525 | 5/1968 | Arksey | 328/48 X |
| 3,526,271 | 9/1970 | Jednacz et al. | 165/26 |
| 3,636,369 | 1/1972 | Harter | 307/141.4 |
| 3,639,844 | 2/1972 | Karklys | 328/130 |
| 3,660,718 | 5/1972 | Pinckaers | 317/13 B |
| 3,662,186 | 5/1972 | Karklys | 34/45 X |

FOREIGN PATENT DOCUMENTS

1076632 7/1967 United Kingdom.
1275913 6/1972 United Kingdom.

*Primary Examiner*—William E. Wayner
*Assistant Examiner*—Larry Jones
*Attorney, Agent, or Firm*—Craig & Antonelli

[57] ABSTRACT

A control apparatus having an electronic timer including a plurality of flip-flop circuits connected in multiple stages in cascade. Outputs are taken from different stages of the electronic timer and the separate outputs are utilized to produce individual control timing signals which serve for controlling at least one device in accordance with the timing specific to the individual control timing signals.

27 Claims, 12 Drawing Figures

CONTROL APPARATUS INCLUDING AN ELECTRONIC TIMER

This is a continuation of application Ser. No. 480,476, filed June 18, 1974, now abandoned.

The present invention relates to a control apparatus with an electronic timer used for the controlling of the various functions considered necessary in the controlled device. When the controlled device is a refrigerator, the functions include the starting and stopping of the compressor and the initiating and completing of the defrosting operation.

In many cases, the refrigerator requires various types of controlling by time. Typically, they include (1) the controlling of defrosting time;

(2) the controlling of time from completion of defrosting until another defrosting operation (which time will be hereinafter referred to as the "defrosting suspension time");

(3) the controlling of the time when an excessive current flows such as when starting the compressor (If this time is too long, an overload condition is indicated and the compressor is required to be stopped. Its time will hereinafter be referred to as the "overload time".); and (4) the controlling of the time following the overload time of (3) above until another starting of the compressor (which time will hereinafter referred to as the "overload suspension time").

Generally, the controlling operations (1) to (4) above involve several tens of minutes, several hours to several tens of hours, several seconds and several minutes, respectively. In most of the conventional methods, a mechanical timer is used for the controlling operations (1) and (2) and a bimetal switch utilizing a thermal time constant or a timer utilizing a time constant circuit comprising a capacitor and a resistor for the controlling operations of (3) and (4). These methods have the following disadvantages:

(1) Most of the mechanical timers are of the single-purpose type and therefore it is necessary to provide a plurality of timers according to different applications.

(2) The timer of charge-discharge type including a combination of a capacitor and a resistor requires a very large capacitor to provide several minutes of controlling, resulting in the bulkiness of the apparatus as well as large power consumption.

(3) A spark generated in opening and closing the mechanical contacts of a bimetal switch is likely to explode a gas which may be filled up in the apparatus, making it necessary to provide a gas proof device. There is also the problem of deterioration of the contacts.

(4) In the mechanical timer, the reliability is usually not good due to deterioration of the movable parts.

Accordingly, it is an object of the present invention to provide a refrigerator control apparatus for effecting various controls by use of a simple electronic timer circuit.

Another object of the invention is to provide a compact and reliable refrigerator control apparatus employing an integrated-circuitry electronic timer.

A further object of the invention is to provide a refrigerator control apparatus operable with a low power consumption without any risk of gas explosion.

In order to achieve the above-mentioned objects, there is provided according to the invention a refrigerator control apparatus in which the compressor, the defrosting heater and other devices of the refrigerator are controlled by a plurality of predetermined sequential timing signals produced from an electronic timer comprising a multi-stage flip-flip circuit in cascade.

The above and other objects, features and advantages will be made apparent by the detailed description taken in conjunction with the accompanying drawings, in which:

Figure 1:
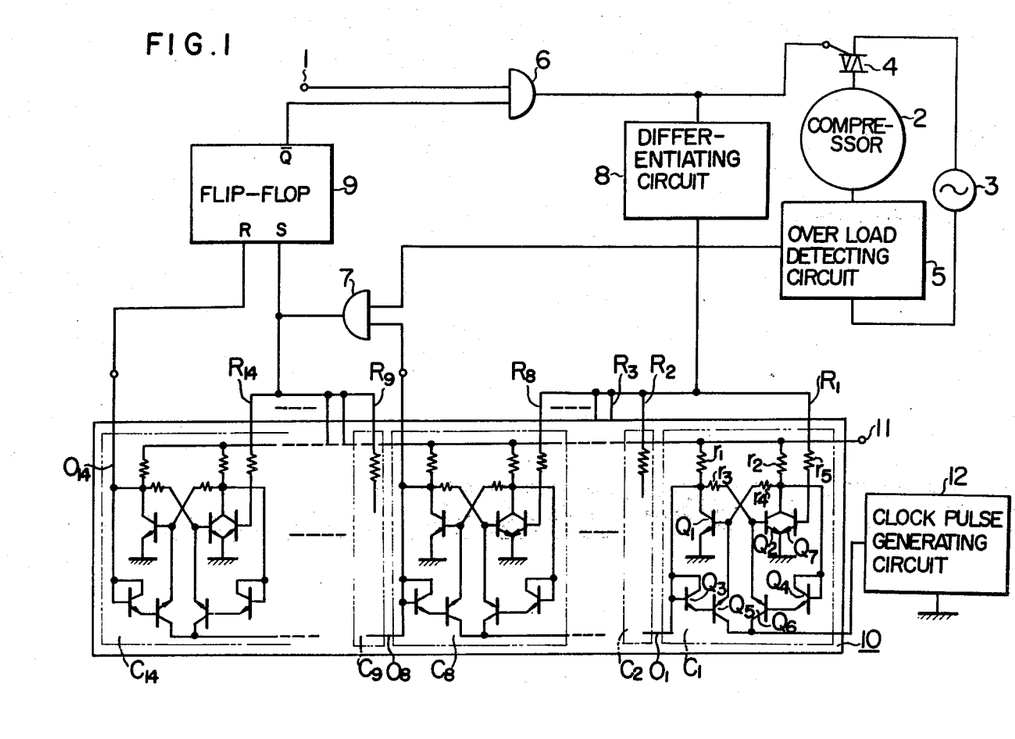
FIG. 1 is a circuit diagram showing the refrigerator control apparatus according to an embodiment of the present invention.

Reference is made to the circuit diagram of FIG. 1 showing an example of the overload control circuit for the compressor of the refrigerator according to the present invention. When the overload time succeeding to the starting of the compressor of the refrigerator exceeds a certain time period, say, about 2.5 seconds, the compressor is required to be stopped to protect it from damage by the overload condition. Subsequent to the stoppage of the compressor until the restarting thereof, lapse of a predetermined overload suspension time, say, about 160 seconds is needed for the reason of load requirements. These functions are incorporated in the embodiment of FIG. 1.

In FIG. 1, reference numeral 1 shows a digital signal input terminal for starting and stopping a compressor 2. As will be described later, a digital signal is applied to this terminal through an appropriate circuit from a temperature sensor for detecting the temperature in the refrigerator. Reference numeral 3 shows an AC power supply for driving the compressor 2, numeral 4 a control element for controlling the start and stop of the compressor 2 comprising, for example, a FLS (five-layer switch), numeral 5 an overload detecting circuit, as described in detail later, for detecting an overloaded condition of the compressor, numerals 6 and 7 AND circuits and numeral 8 a differentiating circuit. Reference numeral 9 shows an R-S flip-flop which so functions that when a "1" signal and a "0" signal are applied to the reset terminal R and the set terminal S respectively, a "1" signal is produced at output terminal $\bar{Q}$, while when "0" and "1" signals are applied to the reset terminal R and the set terminal S respectively, a "0" output is produced at the output terminal $\bar{Q}$. Reference numeral 10 shows a binary counter (the shown example including 14 bits) comprising flip-flips $C_1$ to $C_{14}$ connected in cascade, each representing one bit. Each of the flip-flops making up the binary counter 10 comprises transistors $Q_1$ to $Q_7$ and resistors $r_1$ to $r_5$ and is a capacitance-coupled circuit. More in detail, the flip-flop comprises a flip-flop unit comprising transistors $Q_1$ and $Q_2$, load resistors $r_1$ and $r_2$ and feedback resistors $r_3$ and $r_4$, the transistors $Q_5$ and $Q_6$ being provided for the purpose of triggering the flip-flop, the transistors $Q_3$ and $Q_4$ for preventing operating error at the time of triggering by supplying the memory of the flip-flop unit to the transistors $Q_5$ and $Q_6$, and transistor $Q_7$ and resistor $r_5$ for resetting. Reference numeral 11 shows a power terminal for the flip-flops. Symbols $R_1$ to $R_{14}$ show reset signal lines for flip-flops $C_1$ to $C_{14}$ and symbols $O_1$ to $O_{14}$ output signal lines of flip-flops $C_1$ to $C_{14}$, respectively. Reference numeral 12 shows a clock pulse generating circuit for driving the binary counter 10 by the use of, say, pulses after half-wave rectifying and wave shaping a voltage from a commercial power supply.

The operation of the circuit of FIG. 1 will be explained below.

In the case where the clock pulse generating circuit 12 is arranged to produce the clock pulses by half-wave rectifying an AC voltage of the commercial frequency of 50 Hz, signals of "0" or "1" level are produced at regular intervals of about 2.5 seconds by a well known counter operation of the output signal line $O_8$ of the 8th flip-flop $C_8$ of the binary counter 10. In like manner, signals of "0" or "1" appear at regular intervals of about 160 seconds on the output signal line $O_{14}$ of the 14th flip-flop $C_{14}$.

Figure 2:
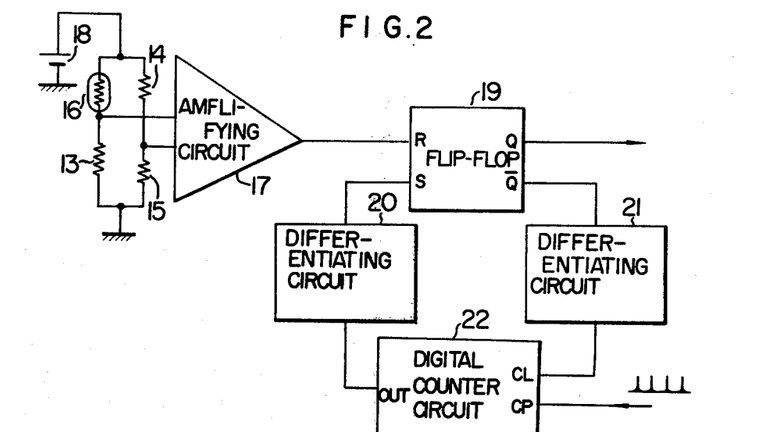
FIG. 2 is a circuit diagram showing an example of the circuit for producing digital signals to be applied to the circuit of FIG. 1.

The digital signal applied to the input terminal 1, on the other hand, is generated by a circuit such as shown in FIG. 2. In this drawing, reference numerals 13, 14 and 15 show resistors which make up a bridge circuit together with a temperature sensing element 16 provided for sensing the temperature of a section which is required to be controlled such as the freezer of the refrigerator. Reference numeral 17 shows an amplifying circuit for amplifying the output of the bridge circuit. Numeral 18 shows a power supply for the bridge circuit.

The bridge circuit and the amplifying circuit 17 make up a temperature detecting circuit in such a manner that the output signal level of the amplifying circuit 17 to "0" at a temperature of the controlled section higher than a predetermined level and it is "1" at a temperature of the controlled section equal to or lower than the predetermined level.

Reference numeral 19 shows an R-S flip-flop so constructed that the output terminal Q becomes a "0" level and output terminal $\bar{Q}$ a "1" level upon application of a signal of "1" level to the reset input terminal R, while the output terminals Q and $\bar{Q}$ change to "1" and "0" levels respectively when a "1" signal is applied to the set input terminal S, the reset input terminal R being connected to the output terminal of the amplifying circuit 17.

Reference numerals 20 and 21 show differentiating circuits, and numeral 22 a digital counter circuit. The input terminal of the differentiating circuit 20 is connected to the output terminal OUT of the digital counter circuit 22, and the output terminal thereof is connected to the input terminal S of the R-S flip-flip circuit 19. The differentiating circuit 20 applies one pulse signal of "1" to the set input terminal S of the R-S flip-flop 19 the instant the output terminal OUT of the digital counter circuit 22 becomes "1".

The input terminal of the differentiating circuit 21 is connected to the output terminal $\bar{Q}$ of the R-S flip-flop 19, and the output terminal thereof to the clear terminal CL of the digital counter circuit 22. The differentiating circuit 21 is such that one pulse of "1" is applied to the clear terminal CL of the digital counter circuit 22 the very instant the output terminal $\bar{Q}$ of the R-S flip-flop 19 changes to "1" level.

Clock pulses of an appropriate frequency, say, 50 Hz are applied to the clock input terminal CP of the digital counter circuit 22. The digital counter circuit 22 counts the applied clock pulses in sequence, so that the output terminal OUT changes to the "1" level as soon as a predetermined number of pulses have been counted, that is to say, when a predetermined period of time, say, 5 minutes have passed. Upon application of a "1" signal to the clear terminal CL, the memory stored in the digital counter circuit 22 is all erased, and the counting is resumed when the input to the clear terminal CL becomes "0".

A timer circuit is made up of the R-S flip-flop 19, the differentiating circuits 20 and 21 and the digital counter circuit 22. The output terminal Q of the R-S flip-flop 19 is connected to the input terminal 1 shown in FIG. 1, so that when the output terminal Q is at "1" level, the compressor 2 is driven while it is stopped by the "0" level of the terminal Q. The output terminal Q is at a "1" level at the initial state where the power supply switch of the control circuit is closed and both the output terminals R and S are at "0" level.

The operation of the above-mentioned circuit will be explained below.

When the temperature of the section to be controlled is higher than a predetermined level, the output of the amplifier circuit 17 is "0", while the output terminal Q of the R-S flip-flop 19 is at "1" level, with the result that the compressor 2 is driven thereby to cool the section to be controlled.

When the temperature of the controlled section is reduced to the predetermined level, then the output signal of the amplifying circuit 17 becomes "1", the state of the R-S flip-flop 19 is reserved to render the output terminal Q "0", and the compressor 2 stops its operation. At the same time that the output terminal Q becomes "0", the output terminal $\bar{Q}$ changes to "1". At this instant, the differentiating circuit 21 applies a pulse signal of "1" level to the clear terminal CL of the digital counter circuit 22, with the result that the stored content of the digital counter circuit 22 is erased thereby to begin the counting of clock pulses again.

The stoppage of the compressor 2 causes the temperature of the controlled section to be gradually increased so that the output signal of the amplifying circuit 17 returns to "0" level, whereas the output terminals Q and $\bar{Q}$ of the R-S flip-flop 19 are maintained at "0" and "1" levels respectively, thereby maintaining the compressor stopped.

The digital counter circuit 22 begins to count the clock pulses with the stopping of the compressor. When it has counted a predetermined number of clock pulses, that is to say, a predetermined period of time has passed, the output terminal OUT becomes "1" and the differentiating circuit 20 applies a pulse signal of "1" level to the input terminal S of the R-S flip-flop 19. As a result, the R-S flip-flop 19 is reversed again, so that the output terminals Q and $\overline{Q}$ change to "1" and "0" levels thereby to drive the compressor 2 again. The resumption of the operation of the compressor causes the temperature of the controlled section to be decreased again. The above-mentioned processes are repeated.

The temperature control circuit with the above-described arrangement is advantageous in that since the circuit sections other than the circuit associated with the stoppage of the compressor are digital circuits, no adjustment is required except for the set temperature $T_{OFF}$ at which the compressor is to be stopped, resulting in a great saving of adjustment effort and low manufacturing cost.

Further, if the period of suspension of operation of the compressor is set at, say, 5 minutes which is longer than the period of time required for balancing the pessures of the outlet and inlet ports of the compressor after stoppage, say, 3 minutes, a stable apparatus is obtained without any risk of overheating or locking the motor for the compressor.

Thus, by arranging the apparatus in such a way that a "1" is set at the output terminal $\overline{Q}$ of the R-S flip-flop 9 when a "1" signal is applied to the input terminal 1 of FIG. 1 as a drive signal for the compressor, that is to say, by arranging the circuit in such a manner that the output terminal $\overline{Q}$ of the R-S flip-flop 9 is set "1" simultaneously with the closing of the power supply switch, a "1" output signal is obtained from the AND circuit 6, which signal is used to energize the control element 4 and drive the compressor 2. On the other hand, the rise portion of the output signal of the AND circuit 6 is applied through the differentiating circuit 8 to the reset signal lines $R_1$ to $R_8$ of the flip-flops $C_1$ to $C_8$ of the binary counter 10, thereby to clear the flip-flops $C_1$ to $C_8$, whereupon the counter 10 begins to count from zero the clock pulses for measuring the overload time of the compressor 2.

Simultaneously with the starting of the compressor 2, an overload signal is detected from the overload detecting circuit 5 and applied to the AND circuit 7. The overload signal used here means a signal indicative of an overload current beyond a rated value flows in the compressor 2, which may occur when the compressor does not reach a sufficient number of revolutions from the starting thereof or when the compressor cannot start for operation due to excessive load thereto. This overload signal is detected by such a means as the overload detecting circuit shown in FIG. 3. The overload detecting circuit comprises a current transformer 23 having a primary winding 24 to which the drive current for the compressor is applied, and a secondary winding 25 to which is applied such a DC bias that no output is produced at the overload detecting output terminal 28 within a predetermined value of the drive current except that a pulse signal in synchronism with the frequency of the AC power supply 3 of FIG. 1 appears at the output terminal 28 when an overload current or current exceeding the predetermined value flows. The output signal produced at the output terminal 28 is applied through rectifying means or the like to the AND circuit 7 shown in FIG. 1.

On the other hand, the input of the AND circuit 7 is connected to the output signal line $O_8$ of the 8th flip-flop $C_8$ of the binary counter 10. At the output signal line $O_8$ a "1" signal appears about 2.5 seconds after the starting of the compressor 2. When the overload continues for 2.5 seconds or longer, the output from the overload detecting circuit 5 continues "1" and therefore a "1" signal also appears at the output of the AND circuit 7 and is applied to the set terminal S of the R-S flip-flop 9. Since a "0" signal is applied to the reset terminal R of the R-S flip-flop 9, a "0" signal is produced at the output terminal $\overline{Q}$. As a result, even if a "1" drive signal is applied to the input signal terminal 1, the output of the AND circuit 6 is "0", whereby the control element 4 is turned OFF thereby to stop the compressor 2. In other words, when the overload condition continues about 2.5 seconds or longer, the operation of the compressor 2 is automatically discontinued.

Explanation will be made now of the controlling of the overload suspension time. As already mentioned, when a "1" signal appears at the output terminal of the AND circuit 7, it is applied to the reset signal lines $R_9$ to $R_{14}$ of the flip-flops $C_9$ to $C_{14}$ of the binary counter 10, so that the flip-flops $C_9$ to $C_{14}$ are cleared thereby to begin the counting operation from zero or near to measure the overload suspension time. The counting may not begin from zero due to the error arising from the fact that the binary counter 10 is utilized to detect the overload time. When the compressor 2 stops as a result of the controlling of the overload, the output of the overload detecting circuit 5 becomes "0" and therefore a "0" signal is applied to the set terminal S of the R-S flip-flop 9, thus causing the compressor 2 to maintain its suspended state. During this suspended state, the binary counter 10 counts the overload suspension time, so that about 160 seconds after the stoppage of the compressor 2, a "1" signal appears at the output signal line $O_{14}$ of the flip-flop $C_{14}$ and is applied to the reset terminal R of the R-S flip-flop 9, thereby to produce a "1" signal at the output terminal $\overline{Q}$. Under this condition, if a "1" signal is applied to the input terminal 1, the control element 4 is turned ON thereby to actuate the compressor 2. In this case, the control circuit is such that it is not actuated within about 160 seconds after the stoppage of the compressor 2. This process is repeated subsequently.

In the event of the overload time being about 2.5 seconds or shorter, no "1" output signal appears from the AND circuit 7 and therefore the compressor 2 enters the normal running condition.

Even though the overload time was set at approximately 2.5 seconds and the overload suspension time at approximately 160 seconds in the above-described embodiments, these time periods may be changed as desired by selecting an appropriate number of stages of the flip-flops of the binary counter 10. Also, instead of clearing the flip-flops $C_1$ to $C_8$ by the output of the differentiating circuit 8, only the flip-flops $C_5$, $C_6$, $C_7$ and $C_8$ may be cleared with a small time error. Similarly, there is little error if only the flip-flops $C_{11}$, $C_{12}$, $C_{13}$ and $C_{14}$ are cleared by the output of the AND circuit 7 instead of flip-flops $C_9$ to $C_{14}$. The limitation of the clearing operation to a smaller number of flip-flops makes it possible to reduce the number of reset signal lines required for each flip-flop, thereby facilitating the construction of the apparatus with integrated semiconductors. Further, the clearing of the flip-flops $C_9$ to $C_{14}$ may be easily effected by the output of the differentiating circuit 8.

Figures 3, 4:
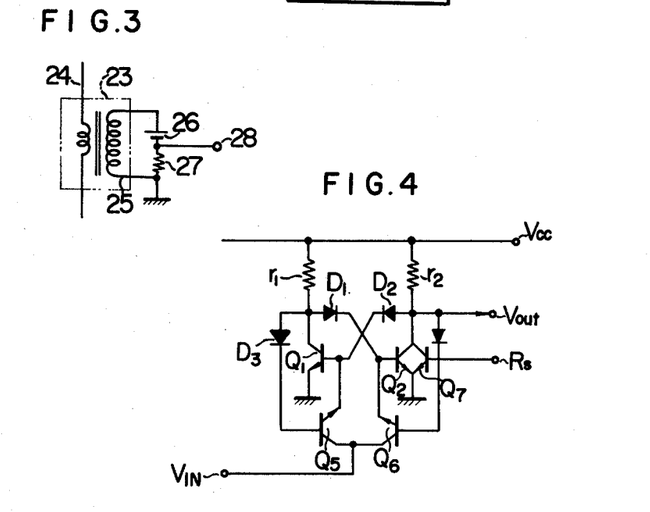
FIG. 3 is a circuit diagram showing an actual example of the construction of the overload detecting circuit included in the circuit of FIG. 1.
FIG. 4 is a circuit diagram showing another example of the flip-flops included in the binary counter shown in the circuit of FIG. 1.

Referring to FIG. 4 showing another example of the flip-flops included in the binary counter of FIG. 1, a flip-flop circuit comprises transistors $Q_1$ and $Q_2$, load resistors $r_1$ and $r_2$ and diodes $D_1$ and $D_2$. The transistors $Q_5$ and $Q_6$ are provided for triggering purpose and function as a kind of capacitance coupling. Diodes $D_3$ and $D_4$ are for supplying the content stored in the flip-flop to the transistors $Q_5$ and $Q_6$ in order to prevent errors at triggering operation, the transistor $Q_7$ being provided for the purpose of resetting.

Symbol $V_{IN}$ shows an input terminal, $V_{OUT}$ an output terminal, $V_{CC}$ a power supply terminal, and $R_S$ a reset terminal.

The circuit of FIG. 4 is different from that of FIG. 1 in that the resistors $r_3$ and $r_4$ of FIG. 1 are replaced by the diodes $D_1$ and $D_2$ respectively to assure stable operation of the circuit and in that in the circuit of FIG. 4 diodes $D_3$ and $D_4$ are used in place of the transistors $Q_3$ and $Q_4$ of FIG. 1, respectively.

Figure 5:
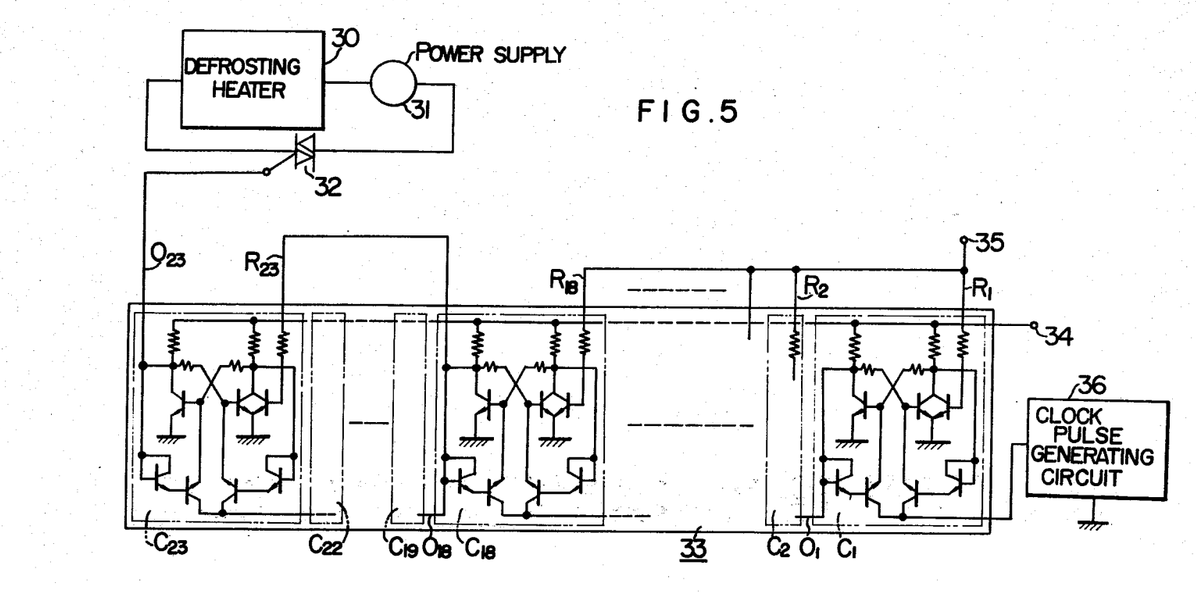
FIG. 5 is a circuit diagram showing another embodiment of the refrigerator control apparatus according to the present invention.

Another embodiment of the invention applied to the defrosting control circuit of the refrigerator is shown in FIG. 5. Formation of excessive frost in the evaporartor of the refrigerator during the cooling period adversely affects the refrigerating efficiency of the refrigerator. Therefore, it is necessary to remove the frost or defrost the refrigerator at appropriate intervals of time. The defrosting control circuit according to this embodiment performs a defrosting operation for approximately 42 minutes at regular intervals of approximately 21 hours. In FIG. 5, reference numeral 30 shows a defrosting heater, numeral 31 a power supply for actuating the defrosting heater 30, and 32 a control element such as an FLS for controlling the supply of electric power to the defrosting heater 30. Reference numeral 33 shows a binary counter comprising flip-flops $C_1$ to $C_{23}$ in cascade which are more in number of stages than the flip-flops included in the preceding embodiment shown in FIG. 1. The counter 33 may alternatively take the form of the counter circuit employed in the case of FIG. 4 or the like. Reference numeral 34 shows a power terminal for the binary counter 33, numeral 35 a reset signal input terminal and numeral 36 a clock pulse generating circuit similar to the circuit 12 shown in FIG. 1. The reset terminal 35 may be omitted if the counter 33 is not utilized to measure a relatively short time such as several seconds in controlling of the overload time, since the counter, generally, performs counting operation correctly. Assuming that the binary counter 33 begins the counting operation with the "0" state of the flip-flops, "1" signal appears at regular intervals of approximately 42 minutes on the output signal line $O_{18}$ of the 18th flip-flop $C_{18}$ of the binary counter 33 and at about every 22 hours on the output signal line $O_{23}$ of the 23rd flip-flop $C_{23}$. If some of the flip-flops are not in the state of "0" when the counting operation begins, "1" signal does not appear on the output signal lines $O_{18}$ or $O_{23}$ at the regular intervals of about 42 minutes or 22 hours respectively at initial periods. This error often occurs at the time of installation of the refrigerator or power failure and poses no serious problem on the normal use of the refrigerator, although it is of course possible to set the initial value on the binary counter 33.

Figures 6, 7:
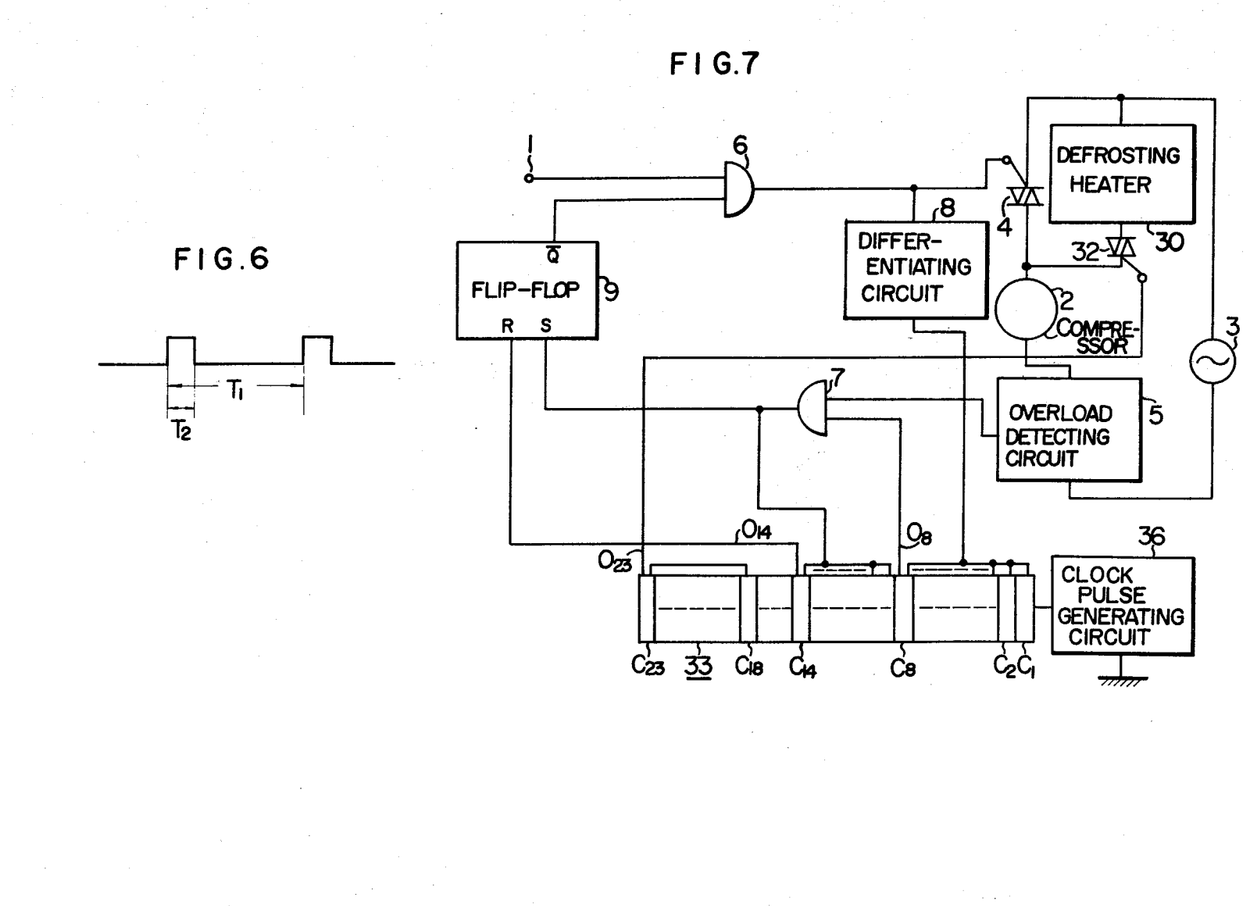
FIG. 6 is a waveform diagram for explaining the operation of the circuit of FIG. 5.
FIG. 7 is a circuit diagram showing still another embodiment of the invention.

To facilitate the understanding, assume that the counting operation is started with the flip-flops in the state of "0". After about 42 minutes, a "1" signal appears on the output signal line $O_{18}$ of the flip-flop $C_{18}$. This output is applied to the reset signal line $R_{23}$ of the flip-flop $C_{23}$. Under this condition, the flip-flop $C_{23}$ is in the state of "0" and therefore the output signal line $O_{23}$ remains unchanged. About 22 hours after the starting of the counting operation, a "1" signal is produced at the output signal line $O_{23}$ of the flip-flop $C_{23}$, which output causes the control element 32 to be turned ON, so that the defrosting heater 30 is energized thereby to begin to defrost the evaporator. After approximately 42 minutes following the production of the "1" signal on the output signal line $O_{23}$, a "1" signal appears on the output signal line $O_{18}$ of the flip-flop $C_{18}$ and causes the resetting of the flip-flop $C_{23}$ and a "0" signal appears on the output signal line $O_{23}$, thereby turning OFF the control element 32 and suspending the operation of the defrosting heater 30. In other words, this circuit produces an output waveform as shown in FIG. 6 on the output signal line $O_{23}$ of the flip-flop $C_{23}$. In the same drawing, $T_1$ shows the defrosting cycle of about 22 hours and $T_2$ the defrosting time of about 42 minutes, the defrosting suspension time thus being $T_1 - T_2$ or about 21 hours.

The defrosting interval and the defrosting time are not limited to 22 hours and 42 minutes respectively as in the above-described control circuit but may be determined as desired according to the number of stages of the binary counter 33 and the manner in which the reset signal applied to the last-stage flip-flop is taken out.

Referring to FIG. 7 showing the refrigerator control apparatus according to still another embodiment of the invention, a control circuit is illustrated which is a combination of the preceding couple of embodiments and capable of overload control and defrosting control at the same time. In FIG. 7, like numerals denote like component elements as in FIG. 1 and FIG. 5, and their operation will not be explained as it is quite the same as that of similar elements in the preceding embodiments.

Generally, the defrosting heater 30 operates during the period of suspension of the compressor 2. Accordingly, the defrosting heater 30 is connected in parallel with the control element 4 of the compressor 2 so that the defrosting heater 30 is supplied with electric power through the winding of the compressor 2 by the power supply 3 when the control element 4 is de-energized. In this case, there is only a small power loss as the impedance of the winding is very low. Also, the fact that the binary counter 33 performs both the overload control and defrosting control at the same time and uses the first to 14th flip-flops commonly for this purpose may lead to an error of several minutes for each of the defrosting interval $T_1$ and defrosting time $T_2$, but this poses no practical problem as it is very small as compared with the amount of $T_1$ and $T_2$.

Figure 8:
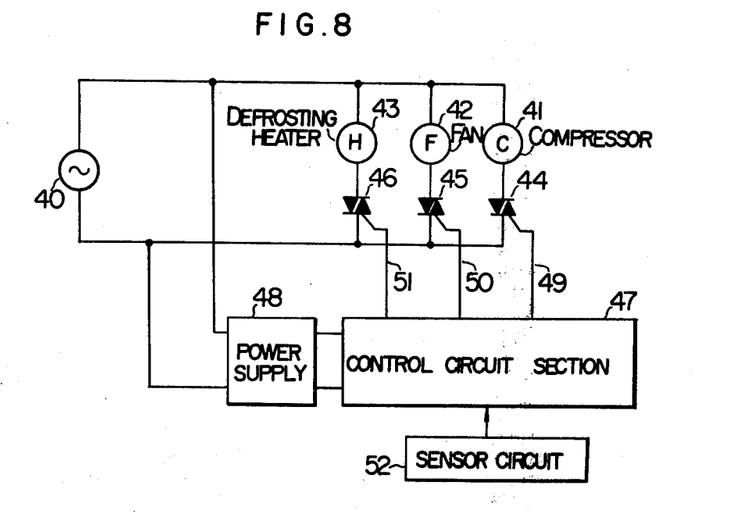
FIG. 8 is a circuit diagram showing a further embodiment of the invention.

An example of the circuit for controlling the compressor, defrosting heater and fan of the refrigerator according to still another embodiment of the invention is shown in FIG. 8.

In the drawing, reference numeral 40 shows a power supply, numeral 41 a motor for driving the compressor for cooling the space in the refrigerator, numeral 42 a fan motor for circulating air in the refrigerator, 43 a defrosting heater for melting frost grown on the evaporator, and numerals 44, 45 and 46 control elements for controlling the on-off operation of the compressor drive motor 41, fan motor 42 and defrosting heater 43, respectively. Reference numeral 47 shows a control circuit section including an electronic timer, numeral 48 a power supply circuit for the control circuit section 47 and numerals 49, 50 and 51 control signal lines leading to the control elements 44, 45 and 46, respectively. Numeral 52 shows a sensor circuit for supplying a signal to the control circuit section 47 and includes detectors for detecting the temperature and current in the circuits.

The apparatus of FIG. 8 controls the temperature in the refrigerator at a predetermined level and functions to decrease the refrigerator temperature competing with such external adverse effects as the opening of the door and defrosting. For this purpose, the embodiment under consideration performs its control operation as follows:

(1) When the compresor 41 is started by turning ON the control element 44, the duration of the starting current which is several times larger than the normal operating current is measured. If its duration is longer than the normal duration, it is considered to indicate an overloaded state and the control element 44 is immediately turned OFF.

(2) The control element 44 remains turned OFF until a certain period of time lapses after the turning OFF thereof.

(3) The control element 44 is turned ON and the compressor 41 is actuated. When the temperature in the refrigerator is decreased below a predetermined level, the control element 44 is turned OFF in response to a signal from the temperature sensor and is so controlled as not to be re-energized until the lapse of a certain period of time.

(4) The running time of the apparatus is measured and after the lapse of a certain period of time, say, 20 hours, the defrosting heater 43 is energized by the control element 46 to remove the frost formed on the evaporator.

(5) Upon completion of a defrosting process, the normal running condition is restored by the defrosting completion sensor. In this connection, a maximum defrosting time is provided to prevent the case of overheating which might occur due to the failure of the defrosting completion sensor. Thus, even in the absence of a signal from the defrosting completion sensor, the defrosting process is stopped after the lapse of a certain period of time and a normal running condition is resumed.

Figure 9:
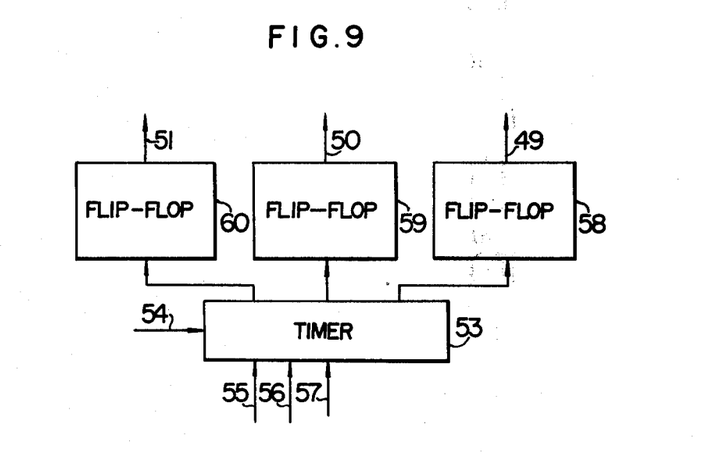
FIG. 9 is a block diagram showing an example of an actual construction of the control circuit section included in the circuit of FIG. 8.

As will be noted from the above description, a plurality of timing signals are required for the controlling operation. Such timing signals include the one associated with the overload time $\tau_{OL}$ for overload protection in the paragraph (1), the one associated with the overload suspension time $\tau_{OFF}$ after the turning OFF of the control element 44 in connection with the paragraphs (2) and (3), the one associated with the defrosting period $\tau_p$ in (4) and the one associated with the maximum defrosting time $\tau_M$ in (5). Referring to FIG. 9 showing an actual construction of the control circuit section 47 of FIG. 8, the various timing signals are produced by the timer 53. The clock pulses of frequency equivalent to the power source frequency are applied to the timer 53 by way of the input sigral line 54 thereby to control the control flip-flops 58, 59 and 60 corresponding to the control elements 44, 45 and 46, respectively, in response to signals produced by the temperature sensor signal line 55, the overload sensor signal line 56 and the defrosting completion sensor signal line 57.

Figure 10:
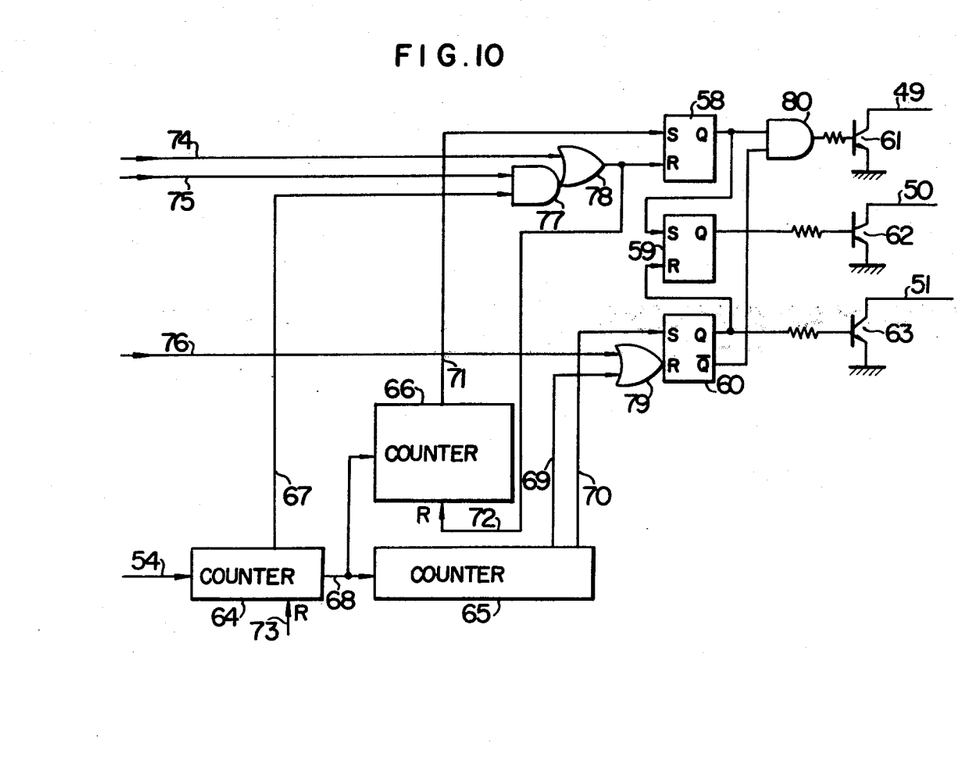
FIG. 10 is a circuit diagram showing another example of the actual construction of the control circuit section of FIG. 9.
Figure 11:
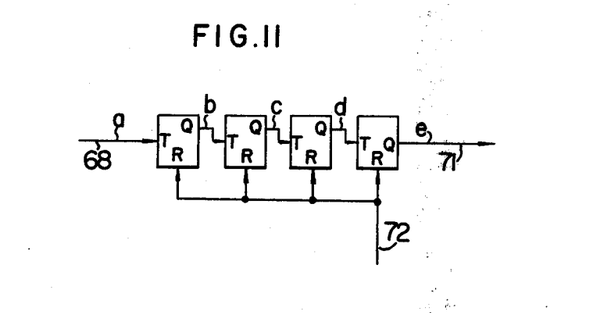
FIG. 11 is a circuit diagram showing an example of the actual construction of the counter included in the circuit of FIG. 10.

Another example of actual construction of the control circuit section of FIG. 9 is shown in FIG. 10. Flip-flops 58, 59 and 60 are provided for the compressor 41, fan 42 and defrosting heater 43, respectively. The output of the flip-flops is applied to the drivers 61, 62 and 63 for triggering the control elements 44, 45 and 46, respectively. The timer 53 in FIG. 9 comprises three counters 64, 65 and 66. The clock pulses from the clock signal line 54 are applied to the counter 64. The counter 64 has a middle stage from which the output line 67 is taken out, while the output line 68 of the last stage of the counter 64 is connected to the input stages of the counters 65 and 66. The counter 65 has a middle stage at which the output line 69 is led out. The output of the last stage of the counter 65 is led to the output line 70. The counter 66 counts the output of the counter 64 and has an output line 71 led out of the last stage output. A signal is applied to the counter 66 by way of the reset input line 72 to clear the stored content thereof. A signal is applied also to the counter 64 by way of the clear line 73 as required. The signal line 74 is one for transmitting information on the refrigerator temperature as supplied from the temperature sensor. When the condition of the signal line 74 is "1", it indicates that a predetermined temperature in the refrigerator has been reached. The signal line 75 is derived from the overload sensor and shows an overloaded condition when it is "1". The signal line 76, by contrast, receives a signal from the defrosting completion sensor and the "1" state thereof indicates the completion of a defrosting operation.

The operation of the control apparatus according to the present invention will be explained with reference to FIG. 10. Let us consider the case in which the refrigerating process is begun by turning ON compressor 41. Under this condition, the signal lines 74 and 76 are in the state of "0+". The flip-flop 58 is set thereby to actuate the compressor 41 as a result of the control element 44 of FIG. 8 being turned ON. Under normal condition, the starting current for the compressor 41 flows in the circuit of FIG. 8 for such a short period of time as about several seconds and then changes into a stable working current. In the event that the load of the compressor 41 is excessive or the compressor 41 is in a locked state for some reason or other, a starting current several times larger than the working current continues to flow. This excessive current flow is detected by the overload sensor output line 75, and this combines with the output from the output line 67 in an AND logical operation to indicate an overload condition. In other words, when the AND gate 77 receives a signal of a duration of several seconds from the output line 67 of the counter 64, the output of the AND indicates the "1" state of the signal line 75 or an overloaded condition in spite of the "1" state of the signal line 67, that is, in spite of the lapse of several seconds. As a result, the flip-flop 58 is reset thereby to stop the compressor 41. When the predetermined level of temperature is reached after a certain period of normal run, the signal line 74 turns to "1", so that the flip-flop 58 is reset through the OR gate 78 thereby to stop the compressor 41, which is not started until the output line 71 of the counter 66 becomes "1" thereby to set the flip-flop 58. By the way, the overload time is determined by a signal produced in the output line 67 of the counter 64.

Figure 12:
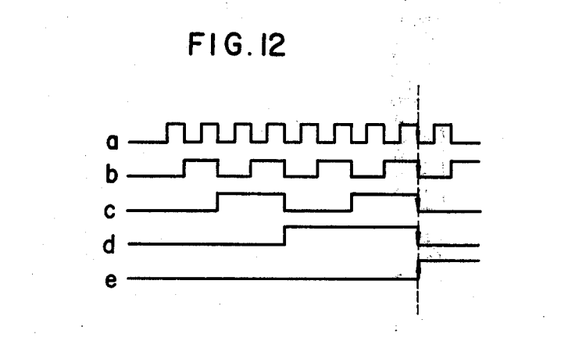
FIG. 12 shows waveforms of output signals produced at the respective stages of the circuit of FIG. 11.

Therefore, the content of the counter 64 must be zero at the instant of starting of the compressor. Each of the counters 64 to 66 comprises a plurality of flip-flops of trigger type connected in cascade. If these flip-flops of trigger type are used in such a manner that their outputs are reversed at the time of fall of input pulses thereto, a change in the output of a given stage indicates that the outputs of all the preceding stages have fallen as will be apparent from the illustrations shown as outputs a to e of FIG. 12. Therefore, the content of the counter 64 is zero at the very instant that the compressor 41 has started its operation by the setting of the flip-flop 58 as the result of the production of "1" signal on the output line 71 of the counter 66. Thus proper timing signals are obtained from the output line 67 without any special procedures.

The counter 66 counts the time during which the compressor 41 remains turned OFF. For this purpose, the counter 66 is cleared by the OFF signal in the reset signal line 72 of the flip-flop 58. In the event that only the counter 66 is cleared, the OFF time undergoes a change by the amount equivalent to the content of the counter 64 at the time of the clearing. The OFF time does not change, on the other hand, if both the counters 64 and 66 are cleared. A change in OFF time affects the temperature in the refrigerator in such a manner that a long OFF time causes the temperature to be increased. Since the temperature changes in the refrigerator are compensated for by the next temperature control cycle depending on the length of ON time, the control as strict as that of the overload time is not necessary. When the output line 70 of the counter 65 becomes "1", the flip-flop 60 is set for defrosting operation. To complete the defrosting operation, the signal line 76 becomes "1" in response to the output from the defrosting completion sensor and the flip-flop 60 is reset through the OR gate 79.

On the other hand, if the counter 65 produces a "1" signal on the output line 69 after the lapse of a predetermined period of time following the beginning of the defrosting operation, the flip-flop 60 is reset thereby to complete the defrosting operation without any "1" signal on the signal line 76.

The fact that the outputs from the output terminal Q of the flip-flop 58 and the output terminal $\bar{Q}$ of the flip-flop 60 are applied to the AND gate 80 indicates that the compressor 41 is turned ON only when the defrosting heater 43 is OFF.

The output terminal Q of the flip-flop 58 is connected to the set terminal S of the flip-flop 59 and the output terminal Q of the flip-flop 60 to the reset terminal R of the flip-flop 59. Further, the output terminal Q of the flip-flop 59 is connected to the driver 62 for driving the fan 42. Therefore, the fan 42 is controlled to be turned ON only when the compressor 41 is turned ON.

As mentioned above, the embodiment under consideration enables a plurality of timing pulses to be produced by the use of a minimum number of counters, thereby leading to a great advantage for practical applications. In other words, the minimum number of required stages of the counter 64 or 65 depends on the maximum control period, that is the defrosting period $\tau_D$ for the embodiment under consideration. Since the input of the counter 66 of the timer for measuring the OFF time of the compressor 41 is the output of the counter 64, there are only several stages of the counter 66 required. To be more exact, the number of such stages is determined by the timing accuracy of pulses from the output line 71. Variations in OFF time counted by the counter 66 are compensated for by the temperature control cycle, and therefore the counting accuracy is not required so. As a result, the stages required for the counter 66 may be as few as 2 or 3 stages. Furthermore, only the counter 66 is cleared for measuring the OFF time while maintaining the content of the counter 64 as it is, and therefore ON-OFF operation does not affect the counter 65, i.e., the defrosting time at all.

As mentioned above, the embodiment under consideration is such that the required four control timing signals involve times $\tau_{OL}$, $\tau_{OFF}$, $\tau_D$ and $\tau_M$, the requirements for which are fully met by merely adding to or three stages to the timer for the defrosting period $\tau_D$. In addition, no error occurs at all in the times $\tau_{OL}$, $\tau_D$ and $\tau_M$, thus making a correct counting of the clock pulses possible. Also, a small error that may occur in the overload suspension time $\tau_{OFF}$ is compensated for by the control cycle and poses no problem on the smooth functions of the control apparatus. By the way, the error in the time $\tau_{OFF}$ can be also eliminated by clearing the counter 64 simultaneously with the counter 66. If the system is employed in which only the counter 66 comprising 2 to 3 stages is cleared, a less amount of connections is required in constructing the circuit in the form of integrated circuits.

It will be understood from the above detailed description that the employment of an electronic timer of binary counter type in the present invention leads to the following great advantages:

(1) Various timings are obtained easily with a small number of counters.

(2) The time setting of a higher accuracy is possible.

(3) The absence of mechanical motion results in high reliability.

(4) Provision of no mechanical contacts eliminates the need for explosion proofness.

(5) The circuit as complex as that of FIG. 1 can be integrated easily on one chip, thereby making possible a compact apparatus low in both cost and power consumption.

What is claimed is:

1. A control apparatus comprising an electronic timer including a plurality of flip-flop circuits connected in multiple stages of first to n-th stages in cascade of that order for counting clock pulses applied to said first stages, means for taking out outputs from different stages in said electronic timer, means for producing from said outputs, separately, individual control timing signals, means for controlling at least one device by each of said control timing signals at a timing specific thereto, and means independent of the clock pulses applied to said timer for clearing the output of at least one of said different stages at a timing different of that for clearing of the output of another of said different stages.

2. A control apparatus according to claim 1, wherein said clearing means comprises means for resetting at least one flip-flop circuit relating to the output of said at least one of said different stages.

3. A control apparatus according to claim 1, wherein said clearing means comprises means for resetting at least part of the flip-flop circuits relating to the outputs of the respective different stages at timings different with each other.

4. A control apparatus according to claim 1, wherein said clearing means is responsive to a signal relating to a predetermined condition of said device.

5. A control apparatus according to claim 1, wherein said clearing means is responsive to at least one output of another of said different stages.

6. A control apparatus according to claim 1, wherein said clearing means comprises means for resetting only selected stages including said at least one stage and a part of those stages which are disposed in the cascade at orders lower than said at least one stage.

7. A control apparatus according to claim 1, in which said clearing means comprises a plurality of resetting means for resetting individually a plurality of groups of selected stages, at timings different from each other, each of said groups of selected stages including a respective one of said different stages and a part of those stages which are disposed in the cascade at orders lower than said respective one stage.

8. A control apparatus according to claim 1, wherein said clearing means is responsive to at least one output of another of said different stages and to a signal corresponding to a predetermined condition of said device for clearing the output of at least one of said different stages.

9. A control apparatus according to claim 1, wherein said clearing means includes clearing signal generating means for generating a clearing signal in response to at least one of said outputs of the different stages of said electronic timer, and supplying means for supplying said clearing signal only to at least one stage other than the stage from which said at least one output is taken out.

10. A control apparatus according to claim 9, wherein said generating means generates said clearing signal in response to at least one of said control timing signals produced from at least one of said outputs, said supplying means supplying said clearing signal to at least one flip-flop circuit only in stages other than said stage from which said at least one output producing said control timing signal to which said signal generating means is responsive is taken out.

11. A control apparatus comprising an electronic timer having a first counter to which clock pulses are applied, second and third counters to which the output of said first counter is applied, each of said first, second and third counters including a plurality of flip-flop circuits connected in multiple stages in cascade, means provided for each of said counters to take out an output from at least a selected one of the stages of each of said counters, means for producing from the outputs of the respective counters, separately, individual control timing signals, controlling means responsive to said control timing signals for controlling at least one device by each of said control timing signals at a timing specific thereto, means for generating a clearing signal in response to at least one of said outputs of said counters, and means for supplying said clearing signal only at at least one counter other than the counter from which said at least one output is taken out.

12. A control apparatus according to claim 11, wherein said clearing signal is generated in response to said at least one output from said first counter, said supplying means supplying said clearing signal only to at least one of said second and third counters for resetting the count thereof.

13. A control apparatus comprising an electronic timer including a plurality of flip-flop circuits connected in multiple stages in cascade, means for taking out outputs from different stages in said electronic timer, means for producing from said outputs, separately, individual control timing signals, means for controlling at least one device by each of said control timing signals at a timing specific thereto, means for generating a clearing signal in response to at least one of said outputs, and means for supplying said clearing signal to at least one flip-flop circuit only in stages other than the stage from which said at least one output is taken so that the stage from which said at least one output is taken is not cleared by said clearing signal.

14. A control apparatus according to claim 13, wherein said supplying means comprises means for supplying said clearing signal to all flip-flop circuits positioned in at least one of said stages other tha said stage from which said at least one output is taken out.

15. A control apparatus according to claim 13, wherein said supplying means includes means for producing a reset signal for application to said flip-flop circuits to be reset different from said flip-flop circuits having said clearing signal supplied thereto in response to said at least one output.

16. A control apparatus according to claim 13, in which each of said flip-flop circuits comprises a flip-flop of capacitance coupled type.

17. A control apparatus according to claim 13, further including means for detecting a signal corresponding to a predetermined condition of said device, said clearing signal generating means generating said clearing signal in response to both said detecting signal and said at least one output.

18. A control apparatus according to claim 13, wherein said at least one flip-flop circuit to which said clearing signal is supplied is positioned in said other stages having an order lower than said stage from which said at least one output is taken out.

19. A control apparatus according to claim 13, wherein said at least one flip-flop circuit to which said clearing signal is supplied is positioned in said other stages having an order higher than said stage from which said at least one output is taken out.

20. A control apparatus according to claim 13, wherein said generating means generates said clearing signal in response to at least one of said control timing signals produced from at least one of said outputs, said supplying means supplying said clearing signal to at least one flip-flop circuit only in stages other than said stage from which said at least one output producing said control timing signal to which said signal generating means is responsive is taken out.

21. A control apparatus comprising an electronic timer including a plurality of flip-flop circuits connected in multiple stages of first to n-th stages in cascade of that order for counting clock pulses applied to said first stages, means for taking out outputs from different stages in said electronic timer, means for producing from said outputs, separately, individual control timing signals, means for controlling at least one device by each of said control timing signals at a timing specific thereto, means for generating a reset signal in response to at least one of said outputs, and means for applying said reset signal only to at least one of said stages other than said stage from which said at least one output is taken so that the stage from which said at least one output is taken is not reset by said reset signal.

22. A control apparatus according to claim 21, wherein said means for applying a reset signal includes means for supplying said reset signals to flip-flop circuits positioned in said stages other than said stage from which said one output is taken out.

23. A control apparatus according to claim 21, wherein said means for applying a reset signal includes means for producing another reset signal for application to stages to be reset different from said stages having said reset signal applied thereto which is generated in response to said one output.

24. A control apparatus according to claim 21, further including means for detecting a signal for responding to a predetermined condition of said device, said reset signal being generated in response to said detecting signal and said one output.

25. A control apparatus according to claim 21, wherein said other stages to which said reset signal is applied are positioned at orders higher than said stage from which said output is taken out.

26. A control apparatus according to claim 21, wherein said other stages to which said reset signal is applied are positioned at orders lower than said stage from which said output is taken out.

27. A control apparatus according to claim 21, wherein said generating means generates said reset signal in response to at least one of said control timing signals produced from at least one of said outputs, said applying means applying said reset signal only to at least one of said stages other than said stage from which said at least one output producing said control timing signal to which said generating means is responsive is taken out.

* * * * *